Nov. 7, 1961  H. BIERMEIER  3,007,386
CLOSURE ASSEMBLY FOR VIEWFINDERS OF REFLEX CAMERAS
Filed Sept. 17, 1959  2 Sheets-Sheet 1

INVENTOR.
HANS BIERMEIER
BY
Michael S. Striker
Attorney

Nov. 7, 1961    H. BIERMEIER    3,007,386
CLOSURE ASSEMBLY FOR VIEWFINDERS OF REFLEX CAMERAS
Filed Sept. 17, 1959    2 Sheets-Sheet 2

INVENTOR.
HANS BIERMEIER
BY
Michael S. Striker
Attorney

United States Patent Office 3,007,386
Patented Nov. 7, 1961

3,007,386
CLOSURE ASSEMBLY FOR VIEWFINDERS
OF REFLEX CAMERAS
Hans Biermeier, Munich, Germany, assignor to Agfa Aktiengesellschaft, Leverkusen, Germany
Filed Sept. 17, 1959, Ser. No. 840,640
Claims priority, application Germany Sept. 17, 1958
15 Claims. (Cl. 95—47)

The present invention relates to cameras. More particularly, the present invention relates to reflex cameras.

In particular, the present invention relates to the viewfinder structure of a reflex camera. This structure usually includes a viewing tube through which the operator can see the image of the subject on the viewing glass. This viewing tube is conventionally provided with turnable flaps which cooperate together so as to close or open the viewing tube. When the flaps are open they form substantially an extension of the tube and it is through these flaps and the tube that the operator views the image of the subject. These flaps are conventionally interconnected with each other and with the viewing tube through fairly complex structures which not only render the camera structure expensive but in addition this structure does not reliably hold out light which enters laterally through the flaps into the tube during viewing of the subjects so as to render the viewing thereof extremely difficult.

One of the objects of the present invention is to provide a closure flap arrangement for a viewing tube of the above type which is exceedingly simple and inexpensive.

Another object of the present invention is to provide a closure flap arrangement which while being simple and inexpensive at the same time reliably shuts out any stray light so that light cannot enter from the sides into the viewing tube.

A further object of the present invention is to provide a closure flap arrangement of the above type which is provided with a magnifying lens assembly through which the image may be viewed.

An additional object of the present invention is to provide an arrangement of the above type where during movement of the closure flap assembly to its closed position the magnifying lens assembly is automatically actuated so as to be returned to its inoperative position.

Still another object of the present invention is to provide an arrangement according to which parts of the structure of the invention which slide with respect to each other will nevertheless not have any light reflecting surfaces which could detract from the ease and accuracy with which the subject is viewed.

With the above objects in view the present invention includes in a reflex camera, a viewing tube and front and rear closure flaps pivotally connected to each other for turning movement with respect to each other between a closed position closing the viewing tube and an open position opening the viewing tube. In accordance with the present invention a means is provided for pivotally connecting only one of these flaps to the viewing tube for turning movement with respect to the latter so that the other closure flap is carried exclusively by the one flap which is pivotally connected to the viewing tube.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

Referring to FIGS. 1–4 of the drawings, it will be seen that a viewing tube 1 is shown therein. This viewing tube 1 conventionally extends upwardly from and surrounds the viewing glass of the viewfinder on which the image of the subject is visible. The viewing tube 1 is in the form of a casting and may, for example, be mounted on the camera interchangeably with a pentaprism which is accommodated interchangeably with the viewing tube 1 in a suitable opening of the camera.

Figure 4:
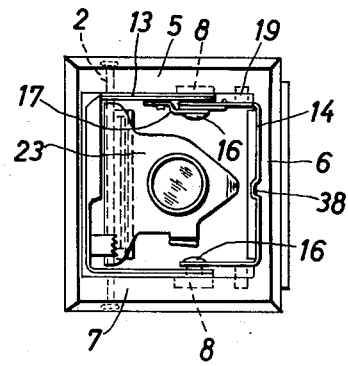
FIG. 4 is a top plan view of the structure of FIG. 1.

The tube 1 carries adjacent the front thereof and adjacent the top thereof an elongated pivot pin 2 which serves as a means for pivotally connecting to the viewing tube 1 the front flap 3 of the closure flap assembly. In accordance with the present invention, there is also provided a rear flap 14, but only the front closure flap 3 is pivotally connected to the viewing tube 1, the rear closure flap 14 being connected only to the flap 3. In the region of the pivot shaft 2 the viewing tube 1 is provided with a forward and upwardly directed edge portion 4. At the other three sides of the tube 1, the latter is provided at its top end with the inwardly directed flanges 5, 6, and 7 (FIG. 4).

Figure 3:
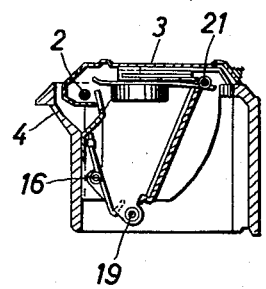
FIG. 3 shows the closure flap arrangement in its closed position.

The front closure flap 3 serves in its closed position as a cover for covering and closing the viewing tube 1. As is apparent from FIG. 3, when the closure flap 3 is in its closed position the free end of the flap 3 which is distant from the pivot shaft 2 engages the flange 6 at the upper rear part of the viewing tube 1. This front closure flap 3 is provided not only with a front wall forming a substantial extension of the front wall of the viewing tube 1, when the flap 3 is in its open position illustrated in FIG. 1, but in addition the flap 3 is provided with a pair of side wall portions 13 which extend rearwardly from the front wall portion thereof. At the bottom edges of the side walls 13 adjacent the rear ends of the latter, when the flap 3 is in the open position illustrated in FIG. 1, this flap 3 is provided with a pair of outwardly directed tongues 8 which thus come to be located beneath the flanges 5 and 7 so that the latter act as stops to limit the turning of the closure flap 3 in a counterclockwise direction, as viewed in FIGS. 1 and 2. The closure flap 3 is shown in its open position in FIG. 1 and in its closed position in FIG. 3, as was pointed out above, and a suitable spring means is provided, in accordance with the present invention, for holding the closure flap 3 in both its open position shown in FIG. 1 and its closed position shown in FIG. 3. This spring means includes the projection 11 of the closure flap 3 as well as the leaf spring 9 which is fixed by the rivet 10, for example, to the front wall of the tube 1. Of course, more than one rivet 10 may be used, if necessary. The projection 11 forms an extension of the closure flap 3 which is curved around the pivot shaft 2, and the free end of the projection 11 cooperates with the leaf spring 9 in the manner which is evident from FIGS. 1–3. Thus, it will be seen that in FIG. 2 the projection 11 has almost reached the dead-center position of the leaf spring 9 in the movement of the parts from the position of FIG. 1 to that of FIG. 3. Once the projection 11 has moved beyond the dead-center position the spring 9 will automatically urge the parts either to the position of FIG. 1 or to that of FIG. 3 depending upon the side of the dead-center that the projection 11 is located on. Thus, as may be seen from FIG. 1, the spring 9 urges the projection 11 and thus the closure flap 3 in a counterclockwise direction about the shaft 2 so as to maintain the closure flap 3 in its open position shown in FIG. 1, while in FIG. 3 the spring 9 bears against the free end of the projection 11 to urge the closure flap 3 in a clockwise direction, as viewed in FIG. 3, and thus in FIG. 3 the spring 9 serves to maintain the parts in their closed position as illustrated in FIG. 3. The closure flap 3 carries at the exterior of its free end a knob 12 capable of being conveniently grasped by the operator, and it is only necessary for the operator to grasp this knob 12 and turn the closure flap 3 beyond its dead-center position so that the spring 9 will continue the movement of the closure flap 3 either to its closed position or to its open position.

Figure 1:
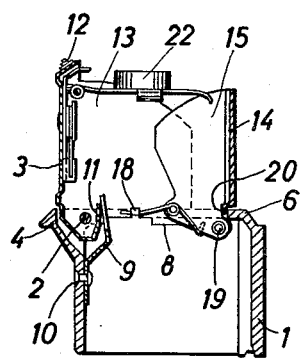
FIG. 1 is a sectional elevation illustrating a viewing tube provided with the closure flap arrangement of the invention, the closure flaps being shown in their open position in FIG. 1.
Figure 2:
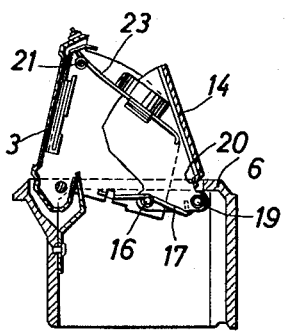
FIG. 2 shows the closure flap arrangement of FIG. 1 between the closed and opened positions of the closure flap arrangement.

The rear closure flap 14 is somewhat smaller than the front closure flap 3 and is provided not only with a rear wall but also with a pair of forwardly extending side walls 15 in the position of the parts shown in FIG. 1. These side walls 15 extend along the inner surfaces of the side walls 13, these inner surfaces being directed toward each other, and the side walls 15 slidably engage the side walls 13 in a light-tight manner. A pair of coaxial pivot pins 16 serve to pivotally interconnect the pairs of overlapping walls 13 and 15, so that in this way the walls 15 are slidable with respect to and turnable with respect to the walls 13 about the common axis of the pivot pins 16. Inasmuch as the pivot shaft 2 forms the only connection of the closure flap assembly to the viewing tube 1, closure flap 14 is carried exclusively by the closure flap 3 through the pivot pins 16. Only the closure flap 3 is pivotally connected to the viewing tube 1, in accordance with the present invention. A wire spring 17 is coiled around one of the pivot pins 16 and has a pair of free ends one of which engages a bottom edge of a wall 15 and the other of which engages a tongue 18 of the cooperating wall 13, as is evident from FIGS. 1 and 2. This spring 17 urges the closure flap 14 to turn in a counterclockwise direction, as viewed in FIGS. 1 and 2, with respect to the closure flap 3. At the lower rear end portions of the walls 15 a pair of pins 19 are provided fixed to these walls 15 and projecting laterally therefrom so that these pins 19 will come to be located beneath the flanges 5 and 7, respectively. Thus, during the movement of the closure flap assembly of the invention from the position of FIG. 2 to that of FIG. 1, it will be seen that the pins 19 cooperate with the flanges 5 and 7 which thus act in cooperation with the pins 19 as a stop means for limiting the turning of the closure flap 14 together with the closure flap 3 from the position of FIG. 2 to that of FIG. 1. Thus, when the parts have reached the position of FIG. 2, the cooperation of the pins 19 of the stop means with the flanges 5 and 7 of the stop means will guarantee that the pivot pins 16 themselves move upwardly from the position of FIG. 2 to that of FIG. 1 while the flap 14 turns in a clockwise direction around the common axis of these pivot pins during movement of the parts to the position of FIG. 1, the pins 19 being in engagement with the under sides of the flanges 5 and 7, at this time. As is apparent from FIG. 2, the rear wall of the closure flap 14 is provided at its bottom end with an inwardly directed portion 20 which overlaps the flange 6 in the open position of the closure flap 14 shown in FIG. 1 so as to provide a labyrinth type of light-tight construction.

Figure 5:
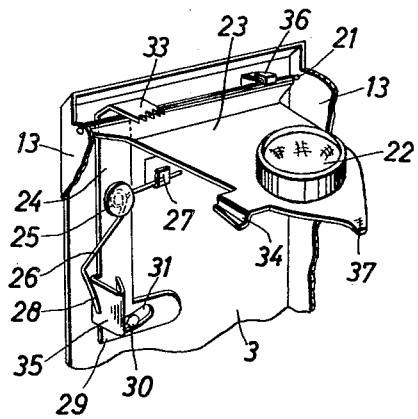
FIG. 5 is a fragmentary perspective view illustrating how a magnifying lens assembly and a lock structure therefor is carried by the front flap of FIG. 1.

Referring now to FIG. 5, it will be seen that the side walls 13 of the front flap 3 carry adjacent to the upper free end of the front flap 3 an elongated pivot shaft 21 which extends between the side walls 13 and which serves to pivotally support a lens carrier plate 23 which carries the magnifying lens 22. An unillustrated coil spring is coiled around the shaft 21, has one end fixed to one of the side walls 13, and has its opposite end fixed to the plate 23 to urge the latter upwardly to the operating position illustrated in FIG. 5.

A releasable lock means is provided for releasably holding the plate 23 together with the lens 22 in an inoperative position closely adjacent to the front wall of the closure flap 3, and this lock means includes the lever 24 which is pivotally carried intermediate its ends by a pin 25 fixed to the front wall of the closure flap 3. A wire spring 26 is coiled around the pin 25, engages with one end a lug 27 which is fixed to the closure flap 3, and engages with its opposite end a catch member 35 of the lever 24 to urge the lever 24 in a counterclockwise direction, as viewed in FIG. 5. The lever 24 is provided adjacent its bottom end with an elongated arcuate slot 31 whose center of curvature coincides with the axis of the pivot pin 25, and a pin 30 is fixed to the front wall of the plate 3 and is located in the slot 31 so that the ends of the slot 31 determined the limits of the turning movement of the lock lever 24. The spring 26 cooperates at its free end 28 with the bottom end 29 of the lever 24 to urge the latter to the end position illustrated in FIG. 5 where the left end of the slot 31, as viewed in FIG. 5, engages the pin 30. This pin 30 may be provided with a head larger than the width of the slot 31 so as to counteract any forces which act normal to the front wall of the closure flap 3. The catch portion 35 of the lever 24 is in the form of a projection of lever 24 which is bent in the manner illustrated in FIG. 5. Because of the springy material of the lever 24 this catch portion 35 also is springy. The carrier plate 23 which carries the lens 22 is provided with a cooperating catch 34 which presses against the catch 35 and snaps behind the free end of the catch 35 when the carrier plate 23 is turned downwardly next to the front wall of the front closure flap 3, so that these catch members 34 and 35 cooperate to maintain the plate 23 and the lens 22 in their inoperative position closely adjacent to the front wall of the closure flap 3. The lever 24 is provided with a top free end 33 accessible to the operator, and the operator need only engage this free end 33 and move it to the right, as viewed in FIG. 5, so as to turn the lever 24 in a clockwise direction, as viewed in FIG. 5, against the force of the spring 26 and thus move the catch 35 away from the catch 34 to release the plate 23 to the spring which is wound around the shaft 22, as described above, so that this latter spring will move the plate 23 up to the operating position thereof illustrated in FIGS. 1 and 5. This carrier plate 23 is provided with a stop projection 36 which engages a lug fixed to the rear surface of the front wall of the closure flap 3 and extending rearwardly therefrom, as illustrated in FIG. 5, so that this lug together with the projection 36 limit the turning of the carrier plate 23 and serve to locate the carrier plate 23 in the position illustrated in FIG. 5 where the magnifying lens 22 is conveniently positioned for the operator.

Although the lens carrier plate 23 can be manually turned down to its inoperative position and locked in this position in the manner described above, the structure of the invention is made so that during the movement of the closure flap assembly from the open position of FIG. 1 to the closed position of FIG. 3 the rear closure flap 14 will cooperate with the carrier plate 23 to turn this carrier plate 23 to its inoperative position as well as to lock it in this position. Thus, as is apparent from FIG. 5, the plate 23 is provided with an elongated downwardly directed tapered free end portion 37 which is located closely adjacent to the rear wall of the rear closure flap 14. This closure flap 14 is provided in its rear wall with a forwardly bulging elongated channel portion 38 (FIG. 4), and this channel portion 38 of the rear wall of the rear flap 14 is aligned with the free end 37 of the carrier plate 23. As may be seen from comparing FIGS. 1 and 2, during the movement of the closure flap assembly to its closed position the channel portion 38 of the flap 14 will engage the projection 37 and slide along the latter urging the carrier plate 23 to turn in a clockwise direction around the pivot shaft 21, as viewed in FIG. 2. After engaging the projection 37, the channel 38 will engage first one peripheral portion of the frame of the lens 22 and then the directly opposed peripheral portion of the frame of this lens, and it will be noted from FIG. 2 that the outer upper periphery of the frame of the lens 22 is suitably chamfered so that the channel 38 engages only smoothly curved portions of the periphery of the frame of the lens 22. After thus crossing over the lens 22 during the turning of the closure flap assembly to the closed position shown in FIG. 3 the free edge of the rear wall of the flap 14, this free edge being distant from the pins 19, engages the carrier plate 23 along a line located between the lens 22 and the pivot shaft 21 so that by pressing the carrier plate 23 along this line the carrier plate 23 continues to be turned by the closure flap 14 to the inoperative position where the flap 23 is located directly next to the front wall of the front flap 3, as is evident from FIG. 3. The spring 17 is strong enough to turn the closure flap 14 to the position illustrated in FIG. 3 as well as to act through the closure flap 14 on the plate 23 to turn the latter to its inoperative locked position in opposition to the spring on the shaft 21 which turns the plate 23 to its operating position illustrated in FIG. 5, and the force of the spring 17 is also sufficiently great to cause the catch 34 to snap behind the catch 35. However, the spring 17 is not strong enough to turn the closure flap 3 in a clockwise direction, as viewed in FIG. 1, in opposition to the spring 9 which acts on the projection 11 in the manner described above.

In order to prevent any light reflecting surfaces from forming at those parts of the magnifying lens assembly and rear closure flap assembly which slidably engage each other, these parts may be covered with a coating of a material which, even after wear, will provide little or no reflection. Thus, a suitable black plastic may be applied to the surface of the channel 38 which is directed toward and slides with respect to the projection 37 as well as to the projection 37 itself and also to those portions of the rim of the frame of the lens 22 which are slidably engaged by the channel portion 38.

Figure 6:
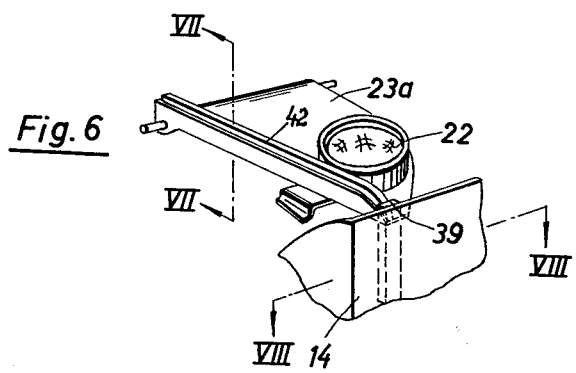
FIG. 6 is a perspective illustration of another embodiment of a magnifying lens assembly and the flap structure which cooperates therewith.
Figure 7:
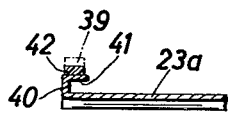
FIG. 7 is a fragmentary sectional view taken along line VII—VII of FIG. 6 in the direction of the arrows.
Figure 8:
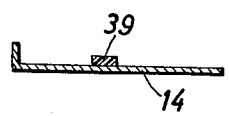
FIG. 8 is a fragmentary sectional view taken along line VIII—VIII of FIG. 6 in the direction of the arrows.

However, it is even better for this purpose, to provide the structure illustrated in FIGS. 6–8, according to which plastic guide strips are provided for this purpose. Thus, instead of an elongated channel portion 38, the rear wall of the closure flap 14 has fixedly connected thereto in any suitable way an elongated strip 39 of a black plastic which will not become light reflecting after considerable wear thereof, and this strip 39 is positioned on the closure flap 14 so as to cooperate with a strip 42 of the same material as the strip 39 and fixed to the lens carrier plate 23a. For this purpose the plate 23a is formed, as shown in FIG. 7, along one side with a substantially U-shaped channel portion providing the plate 23a with the upwardly directed wall 40 and the horizontal wall 41 which carries the strip 42 fixed to the wall 51 in any suitable way, and it will be noted that the strip 42 extends along the plate 23a in the path which the strip 39 moves along during the turning of the flap 14 to its closed position. At the region of the frame of the lens 22 the strip 42 is located at a higher elevation than this frame, as viewed in FIG. 6, and then toward the pivot shaft 21 the elevation of this strip 42 becomes somewhat lower. The catch 34 in this embodiment is in the form of a separate lug which is fixed in any suitable way, as by suitable rivets, for example, to the carrier plate 23a. The strips of plastic 39 and 42 may be glued, for example, to the surfaces which they engage, and they are made of a material which slides easily on itself and which at the same time, even after considerable wear, will not produce any disturbance in operation since even after wear the black material of the plastic strips is non-reflecting. Black coloured polyamid e.g. was found to be a suitable material for this purpose.

It is apparent from the above description that the structure of the invention is extremely simple since it requires but a single pivotal connection of the entire closure flap assembly to the viewing tube 1. Thus, a pair of such pivotal connections as well as special pin and slot connections and the like are completely eliminated with the structure of the invention which at the same time is extremely compact and reliably prevents light from entering from the sides of the closure flaps into the viewing tube.

It will be understood that each of the elements described above, or two or more together, may also find a useful application in other types of cameras differing from the types described above.

While the invention has been illustrated and described as embodied in reflex cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a reflex camera, in combination, a viewing tube; front and rear closure flaps movable between a closed position closing said tube and an open position opening said tube; pivot means providing a single axis pivotally connecting said flaps for movement with respect to each other between said positions; means pivotally connecting only one of said flaps to said tube for turning movement with respect to the latter; holding means releasably holding said one flap in its closed and open positions; and stop means carried in part by said tube and in part by the other of said flaps for holding said other flap in a given position while said one flap continues to turn to its open position to provide relative turning between said flaps when the latter move from said closed to said open position thereof.

2. In a reflex camera, in combination, a viewing tube; a front closure flap turnably connected to said tube for turning movement with respect to the latter between open and closed positions, said front flap having in its open position a front wall forming substantially an extension of a wall of said viewing tube and a pair of side walls extending rearwardly from said front wall; a rear closure flap cooperating with said front flap for closing and opening said tube, said rear flap having an open position where said rear flap has a rear wall forming an extension of a wall of said tube and a pair of side walls extending forwardly from said rear wall and overlapping the side walls of said front flap; a pair of coaxial pivot pins respectively pivotally connecting the overlapping pairs of side walls so that said rear flap is supported by said front flap; and a wire spring coiled in part around one of said pins and engaging the pair of walls pivotally interconnected by said one pin for urging said rear flap to a predetermined position with respect to said front flap.

3. In a reflex camera, in combination, a viewing tube; front and rear closure flaps and means pivotally connecting said flaps to each other for turning movement with respect to each other about a single axis between a closed position closing said tube and an open position opening said tube; means pivotally connecting only one of said flaps to said tube for turning movement with respect to the latter; and spring means cooperating with said one flap for yieldably maintaining the latter both in its closed as well as in its open position.

4. In a reflex camera, in combination, a viewing tube; front and rear closure flaps and means pivotally connecting said flaps to each other for turning movement with respect to each other between a closed position closing said tube and an open position opening said tube; means pivotally connecting only one of said flaps to said tube for turning movement with respect to the latter; and spring means cooperating with said one flap for yieldably maintaining the latter both in its closed as well as in its open position, said spring means including a projection of said one flap and a leaf spring fixed to said tube and engaging said projection.

5. In a reflex camera, in combination, a viewing tube; front and rear closure flaps and means pivotally connecting said flaps to each other for turning movement with respect to each other between a closed position closing said tube and an open position opening said tube; means pivotally connecting only one of said flaps to said tube for turning movement with respect to the latter; and spring means cooperating with said one flap for yieldably maintaining the latter both in its closed as well as in its open position, said spring means including a projection of said one flap and a leaf spring fixed to said tube and engaging said projection, said projection forming an extension of said one flap and extending around the turning axis of said one flap with respect to said tube and during turning of said one flap said projection moving with respect to said leaf spring through a dead-center position so that on one side of said dead-center position said leaf spring cooperates with said projection for maintaining said one flap in one of its positions while on the other side of said dead-center position said leaf spring cooperates with said projection for maintaining said one flap in the other of said positions thereof.

6. In a reflex camera, in combination, a viewing tube; front and rear closure flaps and means pivotally connecting said flaps to each other for movement with respect to each other about a single axis between a closed position closing said tube and an open position opening said tube; means pivotally connecting only one of said flaps to said tube for turning movement with respect to the latter; a magnifying lens turnably carried by said one flap; and spring means cooperating with said lens for urging the latter to an operating position when said one flap is in its open position.

7. In a reflex camera, in combination, a viewing tube; front and rear closure flaps and means pivotally connecting said flaps to each other for movement with respect to each other about a single axis between a closed position closing said tube and an open position opening said tube; means pivotally connecting only one of said flaps to said tube for turning movement with respect to the latter; a magnifying lens turnably carried by said one flap; spring means cooperating with said lens for urging the latter to an operating position when said one flap is in its open position; and releasable lock means connected to said lens and said one flap for holding said lens in an inoperative position.

8. In a reflex camera, in combination, a viewing tube; front and rear closure flaps and means pivotally connecting said flaps to each other for turning movement with respect to each other about a single axis between a closed position closing said tube and an open position opening said tube; means pivotally connecting only one of said flaps to said tube for turning movement with respect to the latter; a lens carrying plate turnably connected to said one flap for turning movement with respect to the latter and adapted to carry a magnifying lens, said plate being spring-urged to an operating position when said one flap is in its open position and said plate having a projection located adjacent the other of said flaps, said other flap cooperating with said projection of said plate during turning of said flaps to said closed position thereof for automatically turning said plate with respect to said one flap to an inoperative position.

9. In a reflex camera, in combination, a viewing tube; front and rear closure flaps and means pivotally connecting said flaps to each other for turning movement with respect to each other between a closed position closing said tube and an open position opening said tube; means pivotally connecting only one of said flaps to said tube for turning movement with respect to the latter; a lens carrying plate and means turnably connecting said plate to said one flap for turning movement with respect to the latter, said plate being adapted to carry a magnifying lens, said plate being spring-urged to an operating position when said one flap is in its open position and said plate having a projection located adjacent the other of said flaps, said other flap cooperating with said projection of said plate during turning of said flaps to said closed position thereof for automatically turning said plate with respect to said one flap to an inoperative position, said other flap having an elongated guide portion cooperating with said projection of said plate.

10. In a reflex camera, in combination, a viewing tube; front and rear closure flaps and means pivotally connecting said flaps to each other for turning movement with respect to each other between a closed position closing said tube and an open position opening said tube; means pivotally connecting only one of said flaps to said tube for turning movement with respect to the latter; a lens carrying plate and means turnably connecting said plate to said one flap for turning movement with respect to the latter, said plate being adapted to carry a magnifying lens, said plate being spring-urged to an operating position when said one flap is in its open position and said plate having a projection located adjacent the other of said flaps, said other flap cooperating with said projection of said plate during turning of said flaps to said closed position thereof for automatically turning said plate with respect to said one flap to an inoperative position, said other flap having an elongated guide portion cooperating with said projection of said plate, said guide portion being formed by a bulging part of said other flap.

11. In a reflex camera, in combination, a viewing tube; front and rear closure flaps and means pivotally connecting said flaps to each other for turning movement with respect to each other between a closed position closing said tube and an open position opening said tube; means pivotally connecting only one of said flaps to said tube for turning movement with respect to the latter; a lens carrying plate and means turnably connecting said plate to said one flap for turning movement with respect to the latter, said plate being adapted to carry a magnifying lens, said plate being spring-urged to an operating position when said one flap is in its open position and said plate having a projection located adjacent the other of said flaps, said other flap cooperating with said projection of said plate during turning of said flaps to said closed position thereof for automatically turning said plate with respect to said one flap to an inoperative position, said other flap having an elongated guide portion cooperating with said projection of said plate, said guiding portion being formed by an elongated plastic strip fixed to said other flap and sliding with respect to said projection of said plate.

12. In a reflex camera, in combination, a viewing tube; front and rear closure flaps and means pivotally connecting said flaps to each other for turning movement with respect to each other between a closed position closing said tube and an open position opening said tube; means pivotally connecting only one of said flaps to said tube for turning movement with respect to the latter; a lens carrying plate and means turnably connecting said plate to said one flap for turning movement with respect to the latter, said plate being adapted to carry a magnifying lens, said plate being spring-urged to an operating position when said one flap is in its open position and said plate having a projection located adjacent the other of said flaps, said other flap cooperating with said projection of said plate during turning of said flaps to said closed position thereof for automatically turning said plate with respect to said one flap to an inoperative position, said other flap having an elongated guide portion cooperating with said projection of said plate, said guiding portion being formed by an elongated plastic strip fixed to said other flap and sliding with respect to said projection of said plate, said plastic strip being made of a black, slippery material.

13. In a reflex camera, in combination, a viewing tube; front and rear closure flaps and means pivotally connecting said flaps to each other for turning movement with respect to each other between a closed position closing said tube and an open position opening said tube; means pivotally connecting only one of said flaps to said tube for turning movement with respect to the latter; a lens carrying plate and means turnably connecting said plate to said one flap for turning movement with respect to the latter and, said plate being adapted to carry a magnifying lens, said plate being spring-urged to an operating position when said one flap is in its open position and said plate having a projection located adjacent the other of said flaps, said other flap cooperating with said projection of said plate during turning of said flaps to said closed position thereof for automatically turning said plate with respect to said one flap to an inoperative position, said other flap having an elongated guide portion cooperating with said projection of said plate, said guiding portion being formed by an elongated plastic strip fixed to said other flap and sliding with respect to said projection of said plate, said plastic strip being made of a black, slippery material, and said projection of said plate also being in the form of an elongated plastic strip.

14. In a reflex camera, in combination, a viewing tube; a front closure flap turnably connected to said tube for turning movement with respect to the latter between open and closed positions, said front flap having in its open position a front wall forming substantially an extension of a wall of said viewing tube and a pair of side walls extending rearwardly from said front wall; a rear closure flap cooperating with said front flap for closing and opening said tube, said rear flap having an open position where said rear flap has a rear wall forming an extension of a wall of said tube and a pair of side walls extending forwardly from said rear wall and overlapping the side walls of said front flap; and a pair of coaxial pivot pins respectively pivotally connecting the overlapping pairs of side walls so that said rear flap is supported by said front flap.

15. In a reflex camera as recited in claim 14, spring means cooperating with said flaps for urging the same to turn to a predetermined position with respect to each other.

References Cited in the file of this patent

FOREIGN PATENTS

| | | |
|---|---|---|
| 590,770 | Germany | Jan. 9, 1934 |
| 637,582 | Germany | Oct. 31, 1936 |
| 553,829 | Italy | June 3, 1957 |